UNITED STATES PATENT OFFICE.

GEORGE H. GOLTRY AND FREDERICK W. HOGARTH, OF PORT ALLEGHENY, PENNSYLVANIA.

IMPROVEMENT IN MEDICAL COMPOUNDS.

Specification forming part of Letters Patent No. 115,460, dated May 30, 1871.

*To all whom it may concern:*

Be it known that we, GEORGE H. GOLTRY and FREDERICK W. HOGARTH, of Port Allegheny, McKean county, State of Pennsylvania, have invented a new and useful Medical Compound, being the Fluid Extract of *Uva Ursi*, of which the following is a specification:

Nature and Object of the Invention.

The invention relates to a medical compound made from the plant known as the *Arctostaphylos uva ursi* or bear-berry, and prepared in the manner, of the ingredients, and in the proportions substantially as hereinafter set forth. The object of the invention is to produce a medicine from the *uva ursi* and other ingredients used, intended to be of a curative nature when administered in diseases affecting the urinary organs.

General Description.

The invention is prepared of the following ingredients, and in substantially the following manner and proportions: The *uva ursi* leaves are ground or otherwise reduced to a fine powder in order that their properties may be more thoroughly extracted. About two (2) pounds of this powder is moistened with twelve (12) ounces of alcohol. This combination is then placed in a filter or percolator and subjected to a moderately strong pressure. While thus operated upon by the said mechanical action diluted alcohol is slowly introduced until three (3) quarts of that fluid shall have passed through the mass under pressure. This result is then placed in a water-bath and its volume reduced to one (1) quart. In this manner the extract of the *uva ursi* is obtained. We then take five (5) ounces of buckthorn berries, (*Rhamnus alnifolius*,) dried and pulverized, and mix therewith two (2) quarts of pure water, which compound is boiled in a covered vessel until the amount of material is reduced to one (1) quart. The liquor should then be drawn off by filtration or other proper means, and to it should be added one-fifth ($\frac{1}{5}$) of its volume of alcohol mixed with the decoction obtained in the above manner from the *uva ursi*. This completes the preparation of the invention, and the same is ready for immediate use.

The usual dose of the compound is a teaspoonful, or about one-fourth ($\frac{1}{4}$) of an ounce, every four hours.

Juniper (*Juniperus Virginiana*) berries may be used with the buckthorn berries in the proportion of eight (8) of the former to ten (10) of the latter.

Claims.

What we claim as our invention, and desire to secure by Letters Patent, is—

The fluid extract of *uva ursi*, prepared of the ingredients and in the proportions substantially as herein set forth.

In testimony that we claim the foregoing medical compound of fluid extract of *uva ursi* we have hereunto set our hands and seals this 7th day of March, 1871.

GEORGE H. GOLTRY. [L. S.]
FREDERICK W. HOGARTH. [L. S.]

Witnesses:
    D. R. BENNETT,
    F. H. ARNOLD.